United States Patent
Romhild et al.

[15] 3,669,371
[45] June 13, 1972

[54] JET-PROPELLED AIRCRAFT HAVING VERTICAL AND HORIZONTAL FLIGHT PROPERTIES

[72] Inventors: Peter Romhild; Eugen Herpfer, Markdorf, Germany

[73] Assignee: Dornier System GmbH Friedrichshafen, Bodense, Germany

[22] Filed: Aug. 3, 1970

[21] Appl. No.: 60,511

[30] Foreign Application Priority Data

Aug. 9, 1969  Germany ................... P 19 40 754.6

[52] U.S. Cl. .................................................. 244/7 A
[51] Int. Cl. ...................................................... B64c 27/22
[58] Field of Search ................. 244/7, 7 A, 1, 6, 43, 46, 73, 244/74, 137, 138, 3.1

[56] References Cited

UNITED STATES PATENTS 2,479,125   8/1949   Leonard .......................... 244/137 X Primary Examiner—Milton Buchler
Assistant Examiner—Carl A. Rutledge
Attorney—James E. Bryan

[57] ABSTRACT

This invention relates to a jet-propelled aircraft having both vertical and horizontal flight properties which comprises tail unit means mounted on a rotor head which means act as rotor blades during vertical flight, jet arm means mounted on the rotor head and having jet nozzles thereon, jet-deflecting means in the jet arms for conveying to the arms the rearwardly emerging gas jet serving for the forward thrust, and means for pivoting the jet arms into and out of an effective position.

4 Claims, 6 Drawing Figures

INVENTORS
PETER RÖMHILD
EUGEN HERPFER

BY James E. Bryan
ATTORNEY

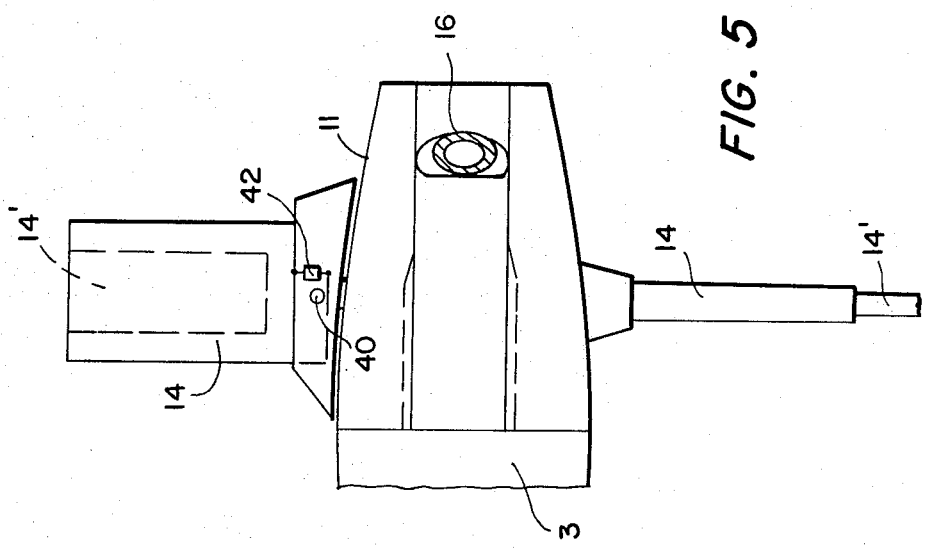
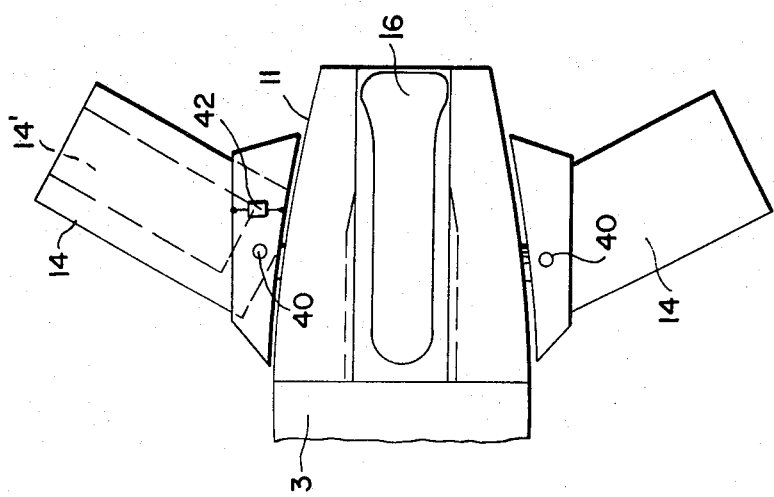

JET-PROPELLED AIRCRAFT HAVING VERTICAL AND HORIZONTAL FLIGHT PROPERTIES

This invention relates to a jet-propelled aircraft having vertical and horizontal flight properties with one or several wing unit and tail unit members which operate or act as rotor blades during the vertical flight phases, and in which the rotor blade operation occurs according to the reaction principle.

In aircraft of this type, particularly in those which operate with hot gas, there are provided within the rotor blades gas-conveying ducts through which the hot gases are conveyed to the nozzles at the blade tips. In most cases the spars of the rotor blades are used for conveying the gas, and for hot gas reaction drives they must be heat-resistant. In order that heat losses be avoided when feeding the gas to the nozzles at the blade tips, it is moreover necessary to provide an insulation therein. The cross-sections of the gas-feeding ducts, which are essentially determined on the basis of the required weight rate of flow of the gas and on the basis of the space requirements with respect to the insulation, require blade profiles having a corresponding dimension for the purpose of accommodating therein the gas-containing ducts. As a result thereof, the blade profiles must be overdimensioned in many instances. Particularly in aircraft in which the tail unit members and the lifting members operate also as rotor blades, the results of overdimensioning are an unnecessarily great weight, a significantly increased drag and, as a consequence of the latter, also a higher power requirement. If the tail unit members include several telescopically extendible parts for the vertical flight phase in which they operate as rotor blades, considerable difficulties will arise with respect to the connection and sealing of the gas-conveying ducts within the elements being movable with respect to each other.

The present invention avoids an overdimensioning of the tail unit members with the adverse consequences thereof. The members which serve during varying flight conditions, on the one hand, as a tail unit and supply the lift while operating, on the other hand, also as rotor blades are intended to be maximally designed, with the use of the reaction principle for the rotor blade drive, in accordance with their varying functions, without requiring one to accept in exchange therefor an increased drag during the high-speed flight. In connection with telescopically extendible rotor blades the present invention simplifies the gas distribution to the jet nozzles.

In the present invention, one or several jet arms are mounted on the rotor head with jet nozzles within the area of their outer ends, jet arms being adapted to be folded out into an effective position by means of pivot bearings, and a jet-deflecting device conveys the rearwardly emerging propellent gas jet, serving for the forward thrust, to the jet arms.

In an aircraft which is constructed and equipped in this fashion, the members may be designed for purposes of their function as a tail and/or a wing unit and as rotor blades, independently of the required cross-section of the gas-conveying means. As a result, a significant amount of weight is saved and the drags may be reduced considerably. The jet arms which are folded in during cruising and high-speed flight equally contribute to keeping the drags low.

In addition thereto, a further essential characteristic of the present invention is that the jet arms, together with the end portions thereof containing the intake openings and the jet-deflecting means, are adapted to be pivoted inwardly into the propellent gas jet in dependence upon the folding-out movement of the jet arms.

Such a construction results in the omission of a separate jet-deflecting device. When the jet arms are brought into the angular position thereof, also the deflection of the gas jet, serving for the forward thrust, into the jet arms serving for the gas feed or conveyance to the jet nozzles takes place forcibly and simultaneously.

On the basis of the features outlined above, another advantageous construction and embodiment of the present invention consists in that the members are adapted to be pivoted out of the position thereof as tail and/or wing unit, respectively, into a sweptback position. For the tail unit and/or wing unit members which are adapted to be pivoted into positive or negative positions, the transfer of the propellent gas between parts executing relative movements, and therewith accordingly also the problem of sealing, which can be solved only at a relatively great expense, are effectively obviated by virtue of the construction and arrangement of the jet arms. The position of the tail and/or wing unit members may therewith be adjusted in a simple manner to the various speeds, based on the angular position of these members as rotor blades.

On the basis of the premise that the jet arms will be brought into the extended position thereof only if the members operate as rotor blades, an additional feature of the present invention is that the longitudinal axes of the jet arms, in the retracted position thereof, are positioned parallel to the longitudinal aircraft axis, and the folding-out movement of the jet arms against the action of return springs is effected by means of the centrifugal forces arising during the operation of the rotor. Such a construction and arrangement renders it possible to eliminate the otherwise required extending and/or retracting mechanisms, as well as a releasing mechanism for the actuation thereof. In order to impart to the rotor, and therewith to the jet arms still being in the retracted position, the acceleration required for the centrifugal force actuation, the rotor blades may be given a setting which places the rotor into autorotation.

One embodiment according to the present invention is illustrated in the accompanying drawings, wherein FIGS. 1a and 1b are schematic perspective views of the aircraft in the horizontal and vertical flying conditions, respectively;

FIGS. 4 and 5 illustrate a portion of the aircraft in longitudinal cross-sections with the tail and/or wing unit members respectively being in different positions.

Figure 1A:
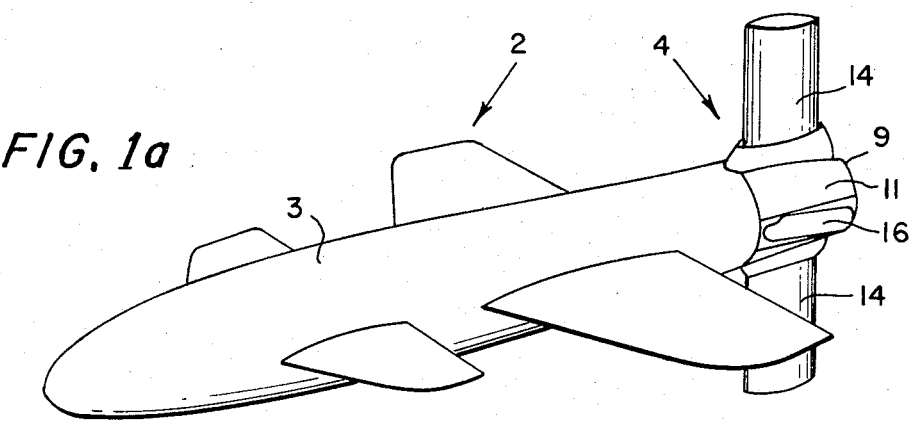

The aircraft shown in the drawing is adapted to fly in two different flying phases. In the first flying phase, the aircraft flies essentially horizontally and is imparted its forward thrust by means of the directly rearwardly emerging propellent gas jet of a jet propulsion unit. In the second flying phase, in which the tail unit members operate or act as rotor blades, the aircraft flies in the manner of a helicopter, the longitudinal aircraft axis extending essentially vertically. The first flying phase is the cruising and the high-speed flying phase.

Figure 1B:
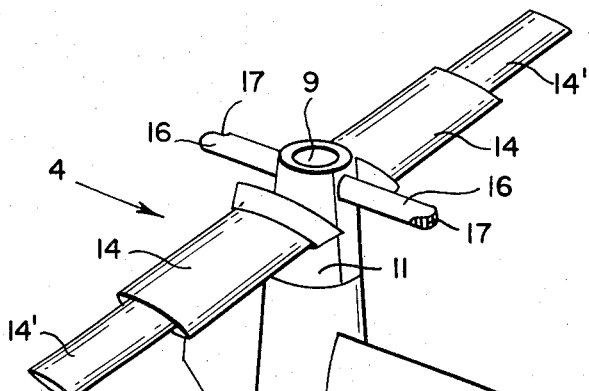
Figure 1B:
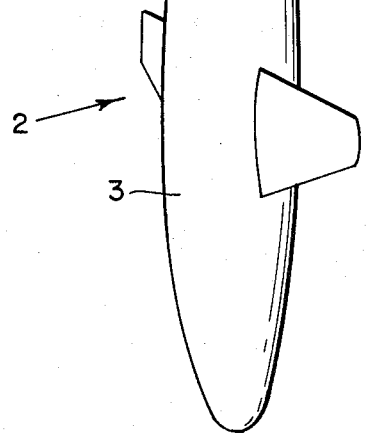

FIG. 1a represents the aircraft in the flying phase of cruising, and FIG. 1b illustrates the vertical flying phase. Reference numeral 2 indicates therein the entire aircraft; reference numeral 3 identifies the airframe, and reference numeral 4 designates the tail and wing unit. Mounted within the airframe 3 is the drive unit 5 (FIG. 2) which consists in this case of a jet propulsion unit comprising a tailpipe and a jet outlet nozzle 9. Mounted at the airframe 3 of the aircraft, concentrically with respect to the tailpipe and to the jet nozzle 9, is a carrier or girder part 11 which may be selectively either locked in position or freely rotating, and which carries the members 14 which act or operate as either a tail unit or as rotor blades. The members 14 consist of elements being adapted to be telescopically displaced with respect to each other, and the telescopic elements 14' are extended in the vertical flying phase in which the members 14 act as rotor blades. The present invention is not concerned, however, with this particular construction and the telescopic arrangement will therefore not be further described herein.

As is apparent from FIGS. 2 to 5, there are mounted at the carrier part 11, in addition to the two members 14 being diametrically oppositely positioned with respect to each other, two jet arms 16 which are positioned either in the same or in another transverse plane being parallel thereto. The jet arms 16 are equally positioned diametrically opposite with respect to each other and, in the circumferential direction, they are each arranged offset about 90° with regard to the members 14. Jet nozzles 17 are mounted at the outer end portions 15 of the jet arms 16. The gas conveyance to the jet nozzles 17 is effected through the hollow jet arms 16. The latter are supported by the carrier and rotor part 11 by means of the pivot bearings 20. The jet arms 16 are pivotal about the pivot bearings 20 into a neutral and/or into an operating position. In the neutral position (FIG. 2), the jet arms 16 are closely adjacent the airframe 3, at which time the principal axes of the arms 16 are parallel to the aircraft axis. It is also possible, however, that spaces or chambers for the low-resistance accommodation of the jet arms 16 be provided within the aircraft contour. In the second position (FIG. 3), the jet arms 16 are positioned between the rotor blades 14, directed radially outwardly, and are positioned either in a common plane therewith or in a transverse plane being parallel thereto. The end portions 25 of the jet arms 16 being coordinated to the jet outlet nozzle 9 of the jet propulsion unit 5 each includes a bent or elbow portion 26 with an inlet opening 27 and jet-deflecting vanes 28, and the cross-sections of the end portions 25 have approximately a semicircular configuration within the area of the openings 27 thereof, while the openings 27 together correspond to the cross-section of the jet outlet nozzle 9. In order that it be possible to carry out the folding-out and/or folding-in of the jet arms 16, setting motors 30 are provided for each of the jet arms 16 and may be so constructed as to be actuatable either electrically or hydraulically.

Figure 3:
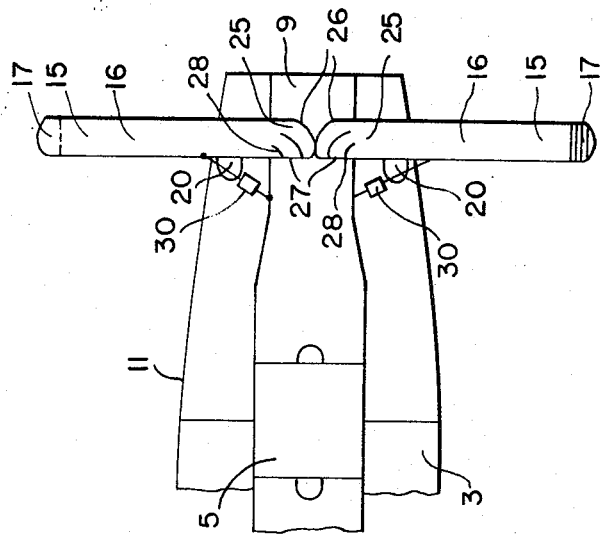
FIG. 3 illustrates a portion of the aircraft, partially in a longitudinal cross-section and at an enlarged scale as compared to FIGS. 1a and 1b, wherein the reaction rotor blade drive is in the extended position thereof.
Figure 2:
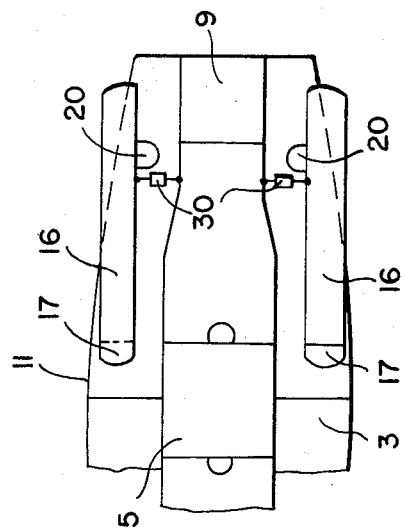
FIG. 2 illustrates a portion of the aircraft, partially in a longitudinal cross-section and at an enlarged scale as compared to FIGS. 1a and 1b, the drive means for the rotor being in the retracted position thereof.

FIGS. 2 and 3 represent more distinctly the two end positions of the jet arms 16. In FIG. 3, the two jet arms are in the extended position thereof in which they point radially outwardly, and the jet nozzles 17 point therein in the same direction with respect to the circumferential movement of the jet arms. In this position, the end portions 25 together with the openings 27 thereof are positioned within the gas jet emerging through the jet nozzle 9 and lead or feed this gas jet in one partial stream each to the coordinated nozzles 17. FIG. 2, on the other hand, illustrates the jet arms 16 in the folded-in position thereof. The propellent gas jet discharging from the jet nozzle 9 can emerge in this case rearwardly without deflection and serves for the forward thrust of the aircraft.

The operation of the aircraft described herein is as follows: when the aircraft is in the cruising or high-speed flying phase shown in FIGS. 1a and 2, the two jet arms 16 are positioned in the folded-in position thereof along the airframe. The end portions 25 are positioned outside of the propellent gas jet of the jet propulsion unit 5 and the jet nozzle 9, the gas jet emerging rearwardly for producing the forward thrust.

If the aircraft is intended to enter into the landing phase from the flying phase shown in FIG. 1a, the locking arrangement between the airframe 3 and the rotor 11 is disengaged and the members 14, which had theretofore operated as a tail and wing unit, are given a different setting. By means of this setting, the rotor 11 and therewith the members 14 being held thereby are placed into autorotation. Due to the position of the center of lift at the aircraft, the latter changes over from the cruising flight phase into the vertical flight phase, which is apparent from FIG. 1b, and in which the members 14 act as rotor blades. The main axis of the aircraft is in this case directed essentially vertically.

Simultaneously with this change into this new flying phase, both jet arms 16 are folded outwardly upon actuation of the setting motors 30. At that time, the end portions 25 of the jet arms 16 with the openings 27 thereof being directed against the jet nozzle 9 of the drive or propulsion unit 5 are immersed into the propellent gas jet and cover the jet nozzle in the end position of the jet arms 16. The propellent gas jet is thus diverted or deflected from its original outlet direction and further conveyed in the same proportions to the jet arms 16, and therewith to the jet nozzles 17 at the outwardly positioned end portions 15. The gas emerges due to the nozzle effect from the jet nozzles 17 so that the rotor 11 and therewith the rotor blades 14 are propelled according to the reaction principle. The aircraft thus moves in this flying phase in the same manner as a helicopter and is therefore adapted to approach a predetermined landing point on the ground, by virtue of a corresponding rotor blade control, and to actually land there.

By virtue of the arrangement of the jet arms 16, the members 14 may be designed according to their functions as both a tail unit and a wing unit, and according to their function as rotor blades, without it becoming necessary to take into account the cross-sections and sealing problems of the gas-conveying means. By folding-in the jet arms, a low drag configuration of the aircraft during the high-speed flight additionally may be obtained.

As is apparent from FIGS. 4 and 5, the members 14 may be constructed so as to be displaceable into different sweptback positions during the high-speed phase in their function as a tail unit and a wing unit, respectively. FIG. 4 illustrates the members 14 in the sweptback position corresponding to the high-speed flight, whereas in FIG. 5 the members 14 assume the position thereof for the vertical flight and rotor position. In order to indicate more clearly the various positions, FIG. 5 shows one member 14 in the position for slow flight; the other member 14 is illustrated in the position thereof for vertical flight.

In order to allow for moving the members 14 into a sweptback position for high-speed flight, members 14 are displaceably positioned about pivot bearings 40 at the airframe 3. Also provided for this purpose are pivot dampers 42 which operate simultaneously as setting motors. The use of a variable tail unit geometry in the construction shown is rendered possible in a simple manner because of the omission of the gas-conveying means by means of the tail unit members. It is thereby possible to eliminate complicated and expensive seals of the gas-conveying means between the rotor 11 and the members 14 acting selectively as rotor blades or as a tail unit.

It will be obvious to those skilled in the art that many modifications may be made within the scope of the present invention without departing from the spirit thereof, and the invention includes all such modifications.

What is claimed is:

1. A jet-propelled aircraft having both vertical and horizontal flight properties which comprises tail unit means mounted on a rotor head which means act as rotor blades during vertical flight, jet arm means mounted on the rotor head and having jet nozzles thereon, jet-deflecting means in the jet arms for conveying to the arms the rearwardly emerging gas from the jet engine serving for the forward thrust, and means for pivoting the jet arms into and out of an effective position.

2. A jet-propelled aircraft according to claim 1 in which the jet arms in retracted position are parallel to the longitudinal aircraft axis.

3. A jet-propelled aircraft according to claim 1 in which the jet arms in retracted position are substantially within the outer contour of the aircraft.

4. A jet-propelled aircraft according to claim 1 including means for pivoting the tail unit means into a sweptback position.

* * * * *